United States Patent [19]

Lipets et al.

[11] Patent Number: 4,501,320
[45] Date of Patent: Feb. 26, 1985

[54] MULTIFLOW TUBULAR AIR HEATER

[76] Inventors: Adolf U. Lipets, prospekt Lenina 150a, kv. 38; Boris I. Alexandrov, ulitsa Udarnikov, 8, kv. 19; Svetlana M. Kuznetsova, Revprospekt 16, kv. 21; Jury I. Okerblom, ulitsa Mira 13, kv. 25, all of Podolsk Moskovskoi oblasti; Jury A. Ershov, ulitsa Vorovskogo 8/1, kv. 1, Moscow; Nadezhda A. Frolova, ulitsa Zheleznodorozhnaya, 8/2, kv. 4, Podolsk Moskovskoi oblasti; Valery A. Malkis, ulitsa Ordzhonikidze, 5, kv. 4, Podolsk Moskovskoi oblasti; Ivan A. Sotnikov, ulitsa Mashinostroitelei, 32, kv. 114, Podolsk Moskovskoi oblasti; Alexei Z. Fedosov, ulitsa Burakova, 7, korpus 2, kv. 18; Robert A. Petrosyan, ulitsa Planernaya, 16, korpus 3, kv. 67, both of Moscow, all of U.S.S.R.

[21] Appl. No.: 62,178
[22] Filed: Jul. 30, 1979
[51] Int. Cl.$^3$ ................................. F28F 9/22
[52] U.S. Cl. .................................... 165/144
[58] Field of Search ........................... 165/144

[56] References Cited

U.S. PATENT DOCUMENTS 3,180,406 4/1965 Oechslin ........................ 165/144
3,315,736 4/1967 Carel ............................. 165/144
3,942,588 3/1976 Schoonman .................... 165/129

FOREIGN PATENT DOCUMENTS 518174 1/1931 Fed. Rep. of Germany ...... 165/144
1451254 2/1969 Fed. Rep. of Germany .
2549359 5/1976 Fed. Rep. of Germany ...... 165/129
1257687 12/1961 France .......................... 165/144

Primary Examiner—Sheldon J. Richter
Attorney, Agent, or Firm—Lilling & Greenspan

[57] ABSTRACT

Air enters each pass of a two-pass air heater in the same direction with respect to gas flows. Bypass air conduits connect each tube bundle of a first tier to the tube bundle of a second tier of adjacent gas ducts and are located between inlet and outlet air conduits and have common walls therewith.

The bypass air conduits connect the tube bundles of all the gas ducts in a single closed (ring) circuit. It is possible to set the gas ducts either along the radius on a single circumference or in a joined-up arrangement with the gas ducts divided into two halves by a vertical partition.

In an alternative embodiment, the bypass air conduits connect the tube bundles of all the gas ducts in an open circuit, the tube bundles of both tiers of the extreme gas ducts are half as wide and are arranged to form a single pass with respect to the air flow.

The thermal efficiency of the air heater is the same as that of a Z-criss-cross type air heater.

8 Claims, 10 Drawing Figures

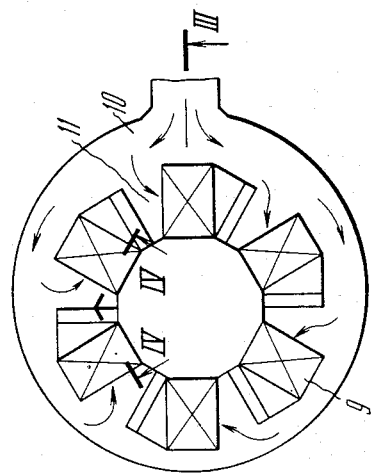
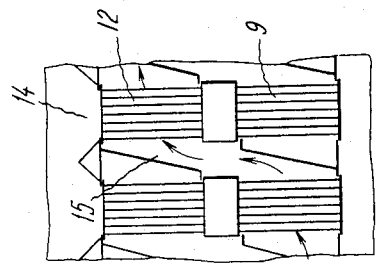
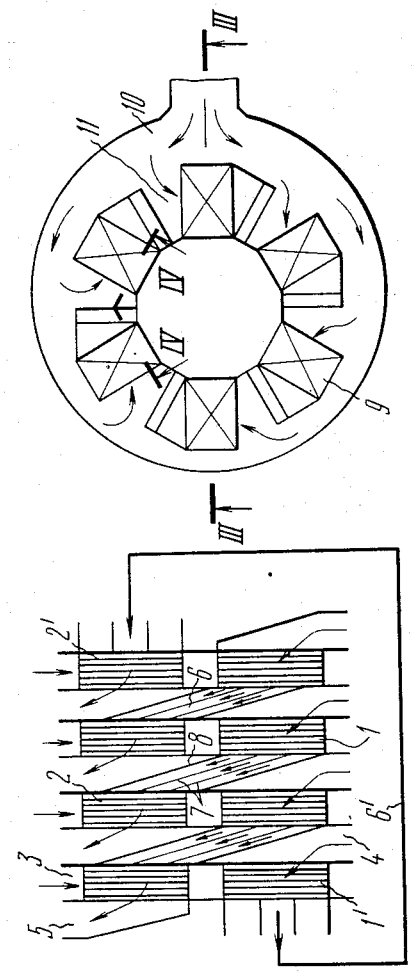
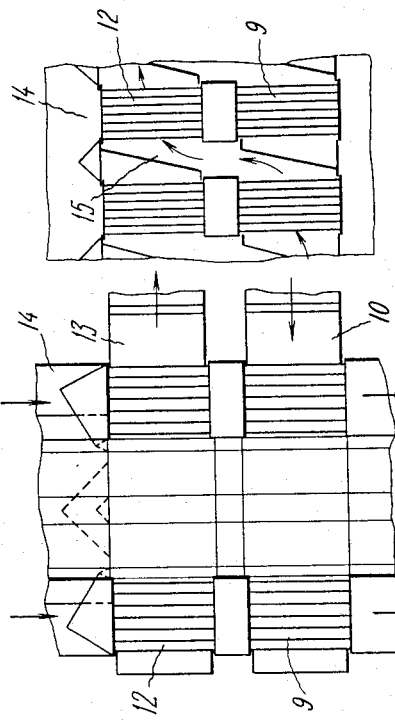

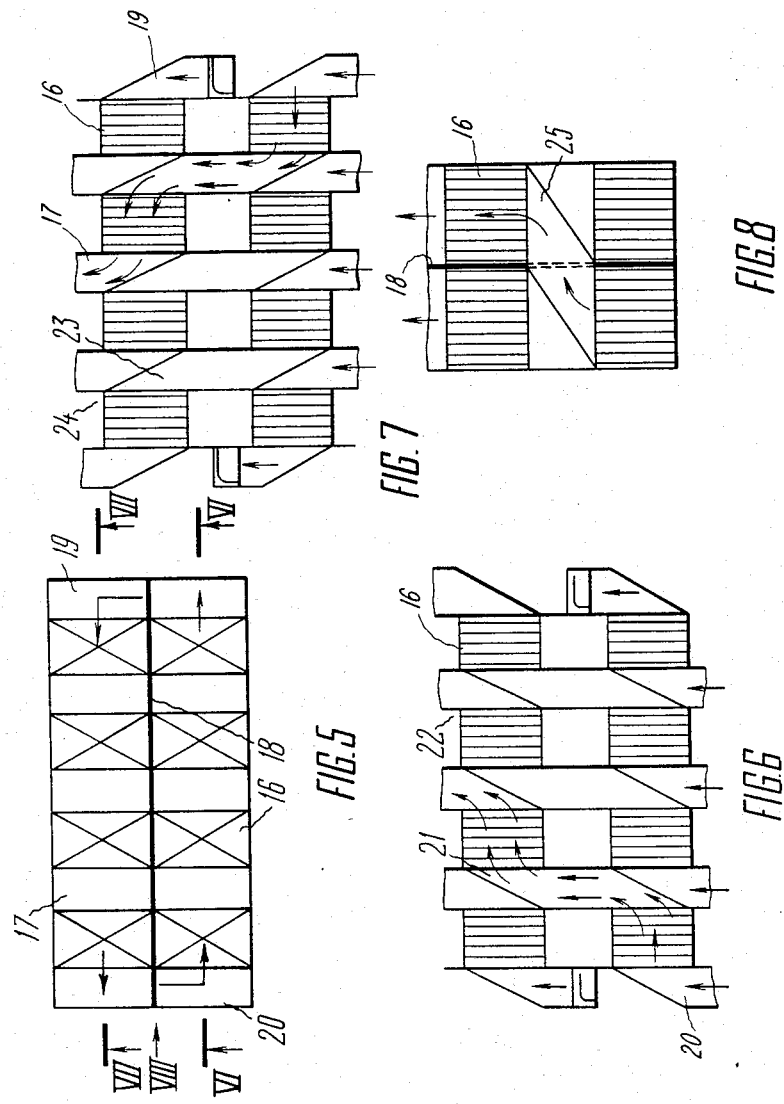

MULTIFLOW TUBULAR AIR HEATER

BACKGROUND OF THE INVENTION

1. Field of the Invention

The invention relates to heat engineering and, more particularly to tubular air heaters for steam boilers, furnaces and similar apparatus, employed mainly for large plants.

2. Description of the Prior Art

There are known tubular air heaters, wherein gases and air flow in a criss-cross pattern with respect to one another. The tubular air heaters for large plants are generally built, to suit the available space, in two-pass arrangements with respect to air flow. The criss-cross flow, which ordinarily presents a poor utilization of the available temperature head, gives rise in the two-pass air heaters to particularly high temperature head losses, attaining 30% and over.

There is known a method for enhancing the temperature head in the air heaters with criss-cross flow, consisting in using a Z-criss-cross flow, wherein air is conveyed to each pass from one and the same side, i.e. of one and the same direction. If there is no leakage of air between the passes, the Z-criss-cross flow performance is substantially improved. The Z-criss-cross flow air heaters are, as a rule, multiple flow ones, i.e. located in parallel gas ducts.

Disadvantages of the Z-criss-cross multiflow air heaters are that they are complicated and the bypass air conduits are bulky, where the provision of internal partitions adequately tight to prevent air leakage between the passes is a problem.

SUMMARY OF THE INVENTION

It is, therefore, an object of the invention to provide such a multiflow two-pass tubular air heater which would have minimum overall dimensions and minimum resistance to air flow.

Another object of the invention is to provide such a multiflow two-pass air heater wherein the partitions in the bypass air conduits separating air flows would be simple in design, while ensuring the flow of hotter air from the first pass into the hot part of the second pass and of colder air from the first pass into the cold part of the second pass.

Still another object of the invention is to provide such a multiflow two-pass air heater wherein all the flows would be identical as to their aerodynamic performance.

And, finally, it is also an object of the invention to provide such a multiflow two-pass air heater which could be manufactured from identical sections.

The above and other objects are attained in a multiflow two-pass tubular air heater with tube bundles arranged in two tiers in parallel gas ducts. Inlet air conduits intended for the passage of air flowing to the tube bundles of the first tier are disposed in one and the same direction with respect to gas flows, and outlet air conduits for the passage of air flowing from each tube bundle of the second tier are disposed on the opposite side. Bypass air conduits with partitions for conveying air from the tube bundles of the first tier into the tube bundles throughout the height of the second tier in a specified direction are also provided. According the invention, the bypass air conduits connect each tube bundle of the first tier to the tube bundle of the second tier of an adjacent gas duct, except for the tube bundles of the first tier of the last gas duct which are connected to the tube bundles of the second tier of the first gas duct in such a manner that the tube bundles of all the gas ducts are connected to the bypass air conduits in a single chain and in the same direction.

Such a structural arrangement makes it possible to provide an air heater with a high thermal efficiency, a minimum weight and a minimum resistance to air flow.

According to an alternative embodiment of the present invention, there is provided a multiflow two-pass tubular air heater, characterized in that the bypass air conduits are located between the inlet and the outlet air conduits and have common walls therewith.

Such a structural arrangement simplifies the overall design, reduces the weight of the air conduits and ensures minimum overall dimensions of the air heater.

In accordance with still another embodiment of the invention, there is provided a multiflow two-pass tubular air heater, characterized in that the bypass air conduits connect the tube bundles of all the gas ducts into a single closed ring circuit.

This structural arrangement provides for similar aerodynamic performance of all the flows of a multiflow air heater.

According to an alternative embodiment of the closed ring circuit, there is provided a multiflow two-pass air heater, characterized in that the gas ducts with the tube bundles are arranged radially from a single center along a circumference.

This technical solution provides a complete symmetry of all the gas ducts and a complete identity of design of all the air conduits.

According to another alternative embodiment of the closed ring circuit, there is provided a multiflow two-pass air heater, characterized in that all the gas ducts are divided by a vertical partition into two halves, the resultant halves of the tube bundles of the gas ducts are connected in accordance with the aforesaid closed circuit.

The technical solution substantially reduces the overall dimensions of the air heater.

And, finally, according to still another embodiment of the invention, there is provided a multiflow two-pass air heater, characterized in that the overall width of the tube bundles of the extreme gas ducts in equal to half the overall width of the tube bundles of the intermediate gas ducts; all the tube bundles in each of the extreme gas ducts are united in a single pass with respect to air and the half-width tube bundles are arranged coaxially and symmetrically with the other gas ducts of the air heater.

This technical solution simplifies the arrangement and enables the air heater to be manufactured of identical sections.

BRIEF DESCRIPTION OF THE DRAWINGS

These and other objects and features of the invention become readily apparent from an embodiment thereof which will now be described by way of example with reference to the accompanying drawings, in which:

FIG. 1 illustrates schematically a vertical projection of an arrangement of a two-pass air heater according to the invention as exemplified by a four-flow embodiment;

FIG. 2 is a top, plan view of the first tier of a ring-type arrangement of a six-flow two-pass air heater;

FIG. 3 is a sectional view taken along the line III—III of FIG. 2;

FIG. 4 is a sectional view taken along the line IV—IV of FIG. 2;

FIG. 5 is a view plan of a closed arrangement of a four-flow two-pass air heater according to a closed circuit;

FIG. 6 is a sectional view taken along the line VI—VI of the air heater shown in FIG. 5;

FIG. 7 is a sectional view taken along the line VII—VII of the air heater illustrated in FIG. 5;

FIG. 8 is a view taken in the direction of arrow VIII of the air heater illustrated in FIG. 5;

DETAILED DESCRIPTION OF THE INVENTION

Figure 9:
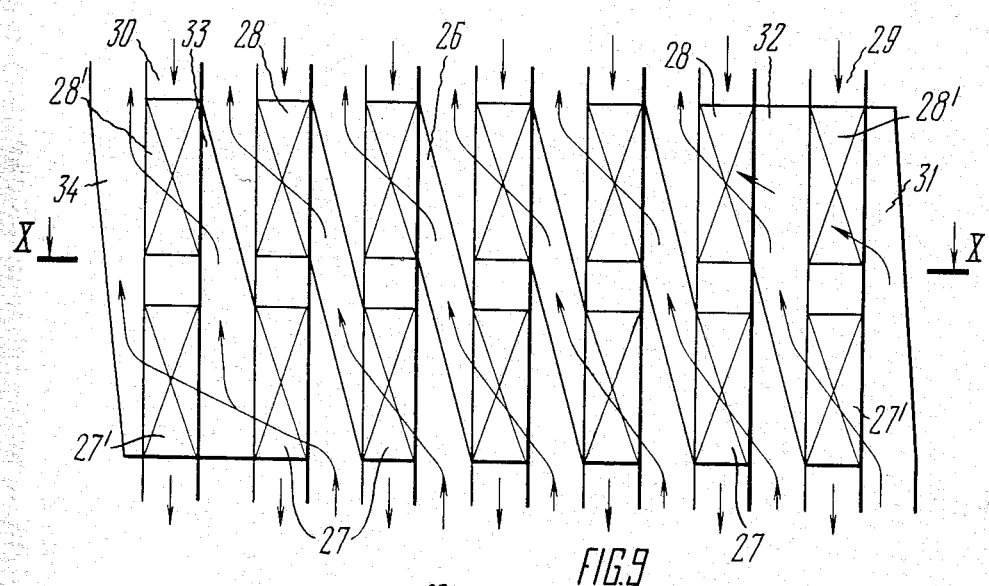
FIG. 9 is a vertical projection of an open arrangement of a seven-flow air heater.

The four-flow two-pass tubular air heater shown and comprises tubular bundles 1, 2 of first and second tiers located in parallel gas ducts 3. The tube bundles 1 are adjoined on one and the same side with respect to gas flows by inlet air conduits 4, and the tube bundles 2 on the opposite side are adjoined by outlet air conduits 5. The tube bundles 1 of the first tier are connected to the tube bundles 2 of the second tier of the adjacent gas duct 3 by sloped bypass air conduits 6 with separating partitions 7. The tube bundles 1' only of the first tier of the last gas duct are connected by a bypass air conduit 6' (shown by a single line on FIG. 1) to tube bundles 2' of the second tier of the first gas duct.

As is readily apparent from FIG. 1, the bypass air conduits 6 are located between the inlet air conduits 4 and the outlet air conduits 5 and have common walls 8 therewith. FIG. 1 shows that all the air conduits—the inlet 4, the bypass 6 and the outlet 5 conduits—ensure the flow of air in the tube bundles 1 and 2 of both tiers in the same direction in all the flows. The direction of air flow is shown by arrows.

Arrows also indicate the direction of flow of gases, which is from the top downwards.

As air is supplied to both passes from the same end, the resultant criss-cross flow of air and gases has no difference to the Z-criss-cross flow, thereby ensuring a high temperature head and a correspondingly high thermal efficiency which is further enhanced by the provision of the separating partitions 7 in the by-pass air conduits directing the more heated air from the first pass into the hot (top) part of the second pass and the less heated air, into the colder (bottom) part of the second pass.

The straight bypass air conduits and the minimum turns of air at inlets and outlets of the tube bundles 1 and 2 provide the best contact with heating surfaces and the minimum resistance to flow.

The location of the bypass air conduits in the voids between the inlet and the outlet air conduits obviates the need for additional space, minimizes the consumption of metal for manufacturing the air conduits and simplifies the design thereof.

FIG. 2 shows a closed ring-type arrangement of a six-flow air heater in a cross section through the first tier, and FIGS. 3 and 4, show sections along the lines III—III and IV—IV, respectively, of the arrangement in FIG. 2.

In this alternative arrangement, the tube bundles 9 of the first tier are located in the gas ducts radially from a single center along a circumference. A common inlet air conduit 10 has a cross sectional shape approximating a circle with the cross section gradually diminishing in accordance with air outflow. The branch pipes 11 to each flow are identical and also have progressively decreasing cross sections.

Tube bundles 12 of the second tier and a common outlet air conduit 13 are better shown in FIG. 3 in the vertical section along the III—III of FIG. 2, and gas ducts 14, connected in parallel, and a sloping bypass air conduit 15, are shown in FIG. 4 in section along line IV—IV of FIG. 2. The flows of air and gases are also indicated by arrows in FIGS. 2, 3 and 4.

A ring-type arrangement ensures maximum identity of operation of all the air heater flows and improves the aerodynamics of the air conduit system as a whole.

FIG. 5 illustrates a plan view of a second alternative arrangement according to a closed circuit, or a joined-up arrangement of a four-flow air heater; FIGS. 6 and 7 are sections along lines VI—VI and VII—VII, respectively, of FIG. 5; and FIG. 8 is a view in the direction of arrow VIII in FIG. 5.

Tube bundles 16 of the second tier and outlet air conduits 17 are shown in FIG. 5. Also readily apparent is a vertical partition 18 separating all the gas ducts into two halves. Bypass air conduits 19 and 20, which connect the tube bundles of the first tier of one half to the tube bundles of the second tier 16 of the other half of the air heater, adjoin on the first and the last gas ducts. These air ducts join up the arrangement into a single closed ring-type circuit.

FIGS. 6 and 7 present vertical sections along lines VI—VI and VII—VII, respectively, of both halves of the air heater shown in FIG. 5. On these figures, bypass air conduits 21 and 23 are shown to connect each tube bundle of the first tier with the tube bundle of the second tier of adjacent gas ducts 22 and 24, except for the previously mentioned first and last gas ducts.

The bypass air conduits in both halves are oriented in opposite directions and form a single circuit with the bypass air conduits of the extreme gas ducts.

And, FIG. 8 illustrates an end view of the same air heater in the direction of arrow VIII (FIG. 5), explaining the design of a bypass air conduit 25 connecting the tube bundles of the first tier of the last gas duct of one half to the tube bundles of the second tier of the first gas duct of the other half. The advantage inherent in the joined-up arrangement is a most compact layout of a multiflow air heater.

Figure 10:
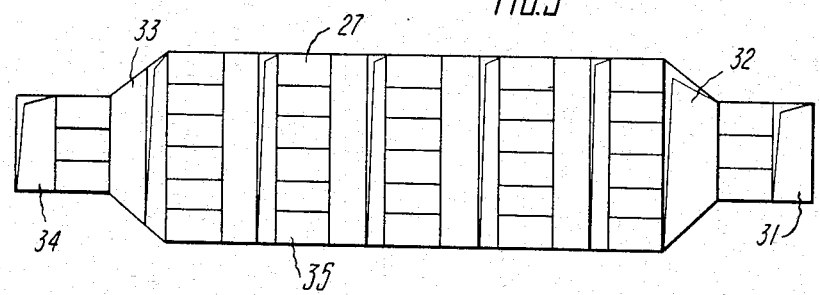
FIG. 10 is a cross sectional view taken along the line X—X of the air heater illustrated in FIG. 9.

FIGS. 9 and 10 illustrate an open arrangement of a two-pass seven-flow air heater, which is presented in FIG. 9 in a vertical projection and in FIG. 10 as a cross section along line X—X of FIG. 9.

FIG. 9 with regard to the middle gas ducts, is similar to the illustrations of FIG. 1; there being a single chain of bypass air conduits 26 connecting tube bundles 27 of the first tier to tube bundles 28 of the second tier of adjacent gas ducts 29 and 30. The tube bundles 27' and 28' of both tiers are united as regards the flow of air into a single pass in each of the extreme gas ducts. Accordingly, inlet air conduit 31 and bypass air conduit 32 of the first gas duct 29, and bypass air conduit 33 and outlet air conduit 34 of the last gas duct 30, differ from the other air conduits.

As shown in FIG. 10, the extreme gas ducts are of a half width as compared to the others. Accordingly, as all the tube bundles represent a single pass, the cross section for the passage of air in the tube bundles of the extreme gas ducts is the same as that in the middle gas ducts, thereby ensuring their aerodynamic identity. The arrangement, according to the invention, provides maximum simplicity of design and at the same time enables the tube bundles of all the gas ducts to be manufactured from identical sections 35 despite differences in the arrangement of the extreme gas ducts as compared to that of the middle ducts.

DESCRIPTION OF THE OPERATION OF THE INVENTION

The air heater according to the invention operates as follows.

The tube bundles 1 of the first pass (first tier) of all the gas ducts (flows) 3 are supplied with air through the inlet air conduits 4 on the same side with respect to gas flows.

Air heated in the first pass, divided into compartments (three, in the case in hand) by the partitions 7, is directed along the bypass air conduits 6 into the tube bundles 2 of the second pass (second tier) in such a manner that hotter air enters the top (hotter) part of the second pass, whereas colder air enters the bottom part of the second pass. Only air, which has entered the tube bundles 1' of the first pass of a last gas duct, is channeled along the air conduit 6' into the tube bundles 2' of the second pass of the last gas duct. The supply of air to both passes from the same side (with respect to gas flow) provides the same thermal efficiency as in a Z-criss-cross flow.

When an air heater is built according to a ring-type arrangement (see FIGS. 2 through 4), its operation is no different to that described above. It is only necessary to mention the distribution of air between the air-heater passes from a common circular air conduit 10, from which air flows via branch pipes 11 into the tube bundles 9 of the first tier. Air passes via the bypass air conduits 15 into the tube bundles 12 of the second tier, then exits from the air heater through the common outlet air conduit 13. Gases enter the air heater passes through the gas ducts 14 which can be united one to another.

In the joined-up arrangement (FIGS. 5 through 8), the air flow may seem to be different from that above. In the two halves of the air heater, separated by a vertical partition 18, air flows in opposite directions through the bypass air conduits 21 and 23. However, the bypass air conduits 19 and 20 on the extreme gas ducts close the air flow circuit, so that the overall direction of air flow is the same for the whole of the air heater, or counter-clockwise in the case in hand.

Air then enters the tube bundles in a manner to cross the gas flows on the same side in both tiers (passes).

In the open arrangement (FIGS. 9 and 10), air flow in the extreme gas ducts differs from that described above. In the first gas duct 29, air enters the tube bundles 27' and 28' of both tiers at the same time via the air conduit 31 to form a single-pass flow, then passes into the tube bundles 28 of the second tier of the second gas duct via the bypass air conduit 32. The operation of the subsequent passes is similar to that described above. In the last gas duct 30, air from the tube bundle 27 of the first tier of the penultimate gas duct enters through the bypass air conduit 33 directly into the tube bundles 27' and 28' of both tiers of the last gas duct and is discharged therefrom via the outlet air conduit 34 to form a single-pass flow.

In this manner, the tube bundles of the extreme gas ducts 29 and 30 operate differently from the tube bundles of the intermediate gas ducts, although the heat transfer coefficients therein are partically the same because of the equality of flow velocities. Some heat loss due to this can be diminished by increasing the number of passes and, in addition, can be compensated for by a simpler air heater design.

What is claimed is:

1. A multiflow two-pass tubular air heater with tube bundles located in first and second tiers in gas ducts, comprising: inlet air conduits supplying air to the tube bundles of the first tier in a same overall direction with respect to gas flow; outlet air conduits exhausting air from each tube bundle of the second tier; bypass air conduits supplying air from said tube bundles of said first tier to the tube bundles throughout the height of the second tier, said bypass air conduits connecting each tube bundle of said first tier to a respective tube bundle of said second tier of an adjacent gas duct, the tube bundles of the first tier of a last gas duct being connected to the tube bundles of the second tier of a first gas duct in a manner that all the tube bundles of all the gas ducts are united by the bypass air conduits into a single circuit and in the same overall direction.

2. A multiflow two-pass tubular air heater as claimed in claim 1, wherein said gas ducts are arranged in parallel.

3. A multiflow two-pass tubular air heater as claimed in claim 1, wherein the bypass air conduits are located between said inlet and outlet air conduits and have walls common therewith.

4. A multiflow two-pass tubular air heater as claimed in claim 3, wherein the overall width of the tube bundles of extreme gas ducts equals half the width of the tube bundles of intermediate gas ducts, all the tube bundles in each of the extreme gas ducts being united with respect to air into a single pass, and the tube bundles of said extreme gas ducts being arranged coaxially and symmetrically with the tube bundles of the intermediate gas ducts of the air heater.

5. A multiflow two-pass tubular air heater as claimed in claim 3, wherein the bypass air conduits connect the tube bundles of all the gas ducts into a single closed ring-type circuit.

6. A multiflow two-pass tubular air heater as claimed in claim 5, wherein the gas ducts with the tube bundles are arranged radially from a single center along a circumference.

7. A multiflow two-pass tubular air heater as claimed in claim 5, wherein all the gas ducts are divided by a vertical partition into two halves, the resultant halves of the tube bundles of the gas ducts being connected in accordance with the said closed circuit.

8. A multiflow two-pass tubular air heater as claimed in claims 1, 5, 7 or 4, wherein said bypass air conduits include separating partitions.

* * * * *